United States Patent Office 3,013,941
Patented Dec. 19, 1961

3,013,941
MASTITIS COMPOSITION
Harvey Gunderson, Elgin, Ill., assignor to Elgin Pharmaceutical Company, a corporation of Illinois
No Drawing. Filed May 9, 1958, Ser. No. 734,131
10 Claims. (Cl. 167—53)

This invention is concerned with medicaments in the treatment of diseases in mammals. Particularly, the invention relates to improvements in veterinary medical preparations and products adapted for use in the treatment of clinical mastitis and other associated diseases of udders in milk-producing animals. As used herein, the term "mastitis" is applied to a disease complex which is characterized by any inflammation of the mammary gland without consideration of etiology.

Infrequently, clinical mastitis has been observed which does not seem to result from or be casual'y connected with pathogenic agents. However, in the usual cases of mastitis, typical micro-organisms are associated with the disease. Among the classes of such micro-organisms, most frequently there is found streptococci, staphylococci, aerobacter, escherichia and pseudomonas, to which the infection may be attributed.

Aside from the fact that the animals suffering from mastitis are generally regarded as being ill, mastitis is of extreme importance in milk production because it produces clots and debris which plug the udders, whereby milk production is substantially reduced.

Essentially, there are two broad categories for conventional treatment of the disease. One is the utilization of chemicals or hormones such as oxytocin which cause stripping or debridement of the infected udders. Many proponents of this treatment contend that in and by itself, it is sufficient because the natural flow of milk which ensues by reason of the stripping and debridement results in a flushing action capable of removing the pathogenic agents responsible for the condition. However, frequently, this first treatment is not entirely successful as udders treated clinically have been found to continue with chronic mastitis following debridement in the foregoing fashion.

According to the best medical procedures, debridement may be considered as only the first step in treating infections and inflammations of the mastitis type, and should be followed by further treatment with an agent calculated to destroy or overcome the micro-organisms responsible for the infection in the first place.

The second category of treatment concerns itself with this latter—the use of agents to destroy the pathogenic agents responsible for the mastitis. Since the advent of the chemo-therapeutic agents or metabolic antagonists, medicaments, which include the sulfas and antibiotics such as penicillin, neomycin, oxytetracycline, polymyxin and bacitracin, have been used by injection into the udders in an endeavor to clear up quickly the pathogenic condition by destruction of the pathogens.

It is with this second category or course of procedure for treatment of mastitis that the instant application concerns itself. The use of the second procedure—that is, the employment of medicaments to destroy the pathogens—is not incompatible with the first outlined method, inasmuch as it is desirable to remove, in gross, as much of the debris as possible from the infected udders prior to treatment with chemo-therapeutic agents or metabolic antagonists.

The products that heretofore have been available for the second course of treatment include a chemical composition to destroy the bacteria and a carrier or vehicle which may be ordinary water or, more customarily, some sort of ointment. The medicament in ointment has been more desirable as a commercial preparation because the concentration of the chemo-therapeutic agent or metabolic antagonist can be better controlled through the use of ointment than with water for effective treatment of the disease and, accordingly, adapts itself in a superior fashion to a suitable preparation. The objection to ointments as carriers or vehicles in the treatment of mastitis, however, rests in the fact that most ointments are not soluble in the udder fluids and, according to recent observation, those ointments that are alleged to be compatible with udder fluids do not seem to disperse rapidly throughout the udder and, thereby, cause discharge of the medicament for an undesirable length of time following the resumption of normal lactation by the treated udder.

The object of this invention, therefore, is to provide a composition adapted for use in the treatment of mastitis which is compatible with the normal fluids of the udder.

It is a further object of this invention to provide a composition for the treatment of mastitis and the like which will liberate medicament for rapid absorption by the treated animal, whereby the milk obtained from the treated udder of such animal will be free from the medicament and the carrier or vehicle therefor within a brief time after administration thereof.

It is a yet further object of the invention to provide a preparation or composition for the treatment of mastitis which will rapidly disperse throughout the entire treated mammary gland, whereby the medicament therein contained is made available at all inter-mammary infected portions of the afflicted mammary gland.

Other and further objects of the invention will become apparent from the following description and accompanying claims.

In accordance with the instant invention, there is provided a composition being a combination of a medicament and a carrier or vehicle which comprises solids derived from milk suspended or dissolved in an inert flowable material such as a fluid or semi-solid material.

The medicament employed is not critical to the invention. That is to say, any medicament possessing therapeutic or bacteria-destroying properties for the intended purpose, and compatible with the vehicle or carrier is suitable, provided the same is effective against the micro-organism or micro-organisms responsible for the disease to be treated. Although other medicaments are effective against the micro-organisms of mastitis, most effective and those preferred are those which fall within the class which I refer to as chemo-therapeutic or metabolic antagonists.

Chemo-therapeutic or metabolic antagonists, as defined herein, refer to that class of substances which destroy pathogens by inhibiting their metabolic processes. Included in, but not defining the limit of, this class of substances are antibiotics such as penicillin, dihydrostreptomycin, neomycin, bacitracin, oxytetracycline and polymyxin and the like, and sulfonamides such as sulfamirazine and sulfamethazine.

Although it might be concluded from the foregoing that an ideal vehicle or carrier for the medicament would be fresh whole milk because it would seem to be most compatible with udder fluids, this is not the case. Such milk, in fact, is not preferred and is contra-indicated. When whole fresh milk is used as the carrier for the medicament which is introduced into the infected udder through the teat orifice into the teat duct, in the conventional manner of medicament administration, undesirable irritating, inflammatory or allergic-type reactions result in the treated udder tissue. This is attributed to either natural changes which occur in the milk as it leaves the udder which produce irritants or allergens, or to possible antigenic factors which vary from one milk-producing animal to another.

However, total solids, derived from milk in accordance with conventional commercial practice, which are suspended and/or dissolved in an inert suspending medium provide an improved medicament carrier or vehicle which, when injected into udders through the teat ducts, does not cause undesirable allergic reactions or inflammation of the udder tissues. Attention is invited to the fact that the solids employed in accordance with instant disclosure have resulted from a treatment of whole milk which subjects the milk to heat. It is, therefore, postulated, that the carrier herein defined and described is free from udder tissue allergens and other irritant or inflammatory factors, and is nonirritating to the tissue to be treated by reason of destruction or change in form or structure of such allergens or irritants due to the heat treatment.

The inert suspending medium for the total milk solids which is preferred is water because it is most compatible with the natural udder materials. However, there is no reason why other suspending media for the milk solids, obvious to those skilled in the art, may not be used within the scope of this invention.

In order that the invention is well understood, there is set forth the following examples of formulae used with gratifying results to treat cow udders infected with mastitis:

*Example I*

| | |
|---|---|
| Procaine penicillin | 100,000 units. |
| Neomycin sulfate | 500,000 units. |
| Dihydrostreptomycin sulfate | 500,000 units. |
| Methyl paraben | 20 milligrams. |
| Propyl paraben | 5 milligrams. |
| Total milk solids | approx. 3.5 grams. |
| Water, q.s. ad 10 ml. | |

*Example II*

| | |
|---|---|
| Neomycin palmitate | 100,000 units. |
| Dihydrostreptomycin sulfate | 500,000 units. |
| Calcium lactate (stabilizer for neomycin palmitate) | 20 milligrams. |
| Methyl paraben | 20 milligrams. |
| Propyl paraben | 5 milligrams. |
| Total milk solids | approx. 3.5 grams. |
| Water, q.s. ad 10 ml. | |

*Example III*

| | |
|---|---|
| Dibenzylethylenediamine penicillin | 100,000 units. |
| Neomycin palmitate | 300,000 units. |
| Dihydrostreptomycin sulfate | 500,000 units. |
| Methyl paraben | 20 milligrams. |
| Propyl paraben | 5 milligrams. |
| Total milk solids | approx. 3.5 grams. |
| Water, q.s. ad 10 ml. | |

The results obtained in the treatment of cows infected with mastitis, using the above formulae, was measurably better than using the medicaments suspended in other conventional carriers for that purpose. Introduction of the formulae herein described was directly into the teat ducts of the infected udders by injection through the respective teat orifices. Each of the examples herein described comprises a single injection and complete treatment by reason of which each infected bovine udder quarter will be completely cured of mastitis.

The total milk solids which I employed in the foregoing formulae resulted from raw milk which was treated by forewarming in accordance with conventional procedures. That is, heating ranged from 200° F. for ten to twenty-five minutes to 248° F. for about three minutes. Thereafter, in the processing of the milk which contained the non-milk solids employed, the solids were sterilized by heating concentrated milk to 240° F. for eighteen to twenty minutes. The foregoing is stated only as being illustrative of temperatures at which irritant, allergen and other inflammation-producing factors are destroyed, attenuated or reduced to acceptable levels. As yet, I have not worked out the precise range of time-temperature relationships at which such factors are removed from or destroyed in the milk solids; however, at the temperature and time relations herein defined, the various enzymes found in milk are destroyed or rendered inactive. It is believed that, in part at least, the enzymes are responsible for the allergic or irritating reactions found when raw whole milk was used as a carrier.

Heat is believed to be only one of several methods for destruction or reduction of the aforesaid undesirable factors found in raw whole milk. Other processes for effectuation of the result are to be considered fully equivalent to heat treating of the raw hole milk.

Effective treatment of mastitis is not the sole concern. It is important to return the cured animal to milk production as quickly as the mastitis is cured. Delay results in usable milk production for the period required to reduce the concentration of the medicament in the milk to levels acceptable by the authorities.

The improved composition described herein enhances the absorption of the medicament into the body and out of the udder over conventional-type preparations and in accordance with the following chart:

| Mammary Area | Vehicle | |
|---|---|---|
| | Milk Solids and Water (Micrograms/ Milliliter) | Ointment (Micrograms/ Milliliter) |
| U | 13.5 | 7.5 |
| M | 22.0 | 54.0 |
| L | 30.0 | 112.0 |

In the chart, U refers to upper, M refers to middle, and L refers to lower. The concentrations shown in the chart are amounts of medicament in the milk of the test animals, present on an average of twenty-one hours following treatment of infected udders with one dose or four hundred milligrams oxytetracycline in ten milliliters each of the vehicles indicated, respectively. The rather low concentration of the medicament in the ointment vehicle in the upper mammary area does not result from rapid absorption of the medicament but rather because the ointment has not diffused throughout the udder to carry more medicament into the upper mammary.

The relatively rapid removal from the udder of the medicament present in the formulations in accordance with the instant invention further has been proven by observing urine levels of the medicament over a continuing period of time.

It is manifest, therefore, that the invention provides a product and process for treatment of mastitis and the like which is compatible with the tissues of the animal treated and which has a relatively high rate of penetration; and the active components of which are relatively rapidly removed from the milk ducts and animal body.

As many changes and substitutions could be made in the above described composition and process and as many apparently widely different embodiments of the invention within the scope of the claims could be constructed without departing from the scope and spirit thereof, it is intended that all matter contained in the accompanying specification shall be interpreted as being illustrative and not in a limiting sense.

I claim:

1. A composition comprising a medicament material adapted to destroy the causal agent of mastitis and a carrier for the medicament including non-irritating, non-inflammatory milk substance comprising the total residue derived by driving off water from milk with heat.

2. A composition as defined in claim 1 further characterized by a flowable material in which the milk solids and medicament are dispersed.

3. A composition as defined in claim 2 in which the flowable material is water.

4. A composition comprising at least one substance from the class defined by metabolic antagonists and chemo-therapeutic agents effective against pathogens causing mastitis, non-inflammatory, non-irritating total cow milk solids, regardless of their source, and water.

5. A composition comprising a therapeutic dose of at least one substance from the class defined by chemo-therapeutic agents and metabolic antagonists effective against pathogens causing mastitis; approximately 3.5 grams of total milk solids, regardless of their source, derived by heating milk, and substantially free from tissue allergenic, inflammatory and irritating factors, and about ten milliliters of an inert flowable material.

6. A composition comprising a carrier of substantially inert total cow milk solids, regardless of their source, and a flowable material in which the milk solids are dispersed, said milk solids being in the ratio of about 3.5 grams to 10 milliliters of flowable material and a therapeutic agent effective against the pathogens of mastitis in said carrier.

7. A process comprising introduction into an infected milk-producing organ of non-irritating, non-inflammatory total cow milk solids, regardless of their source, and a medicament selected from the class comprising metabolic antagonists and chemo-therapeutic agents effective against mastitis.

8. The process of claim 7 in which the milk solids and medicament are carried into and through the milk-producing organ by water.

9. A process comprising injecting into an infected milk-producing organ through the teat duct a therapeutic amount of a medicament selected from the class comprising metabolic antagonists and chemo-therapeutic agents and adapted to treat mastitis and a carrier having the proportion of about 3.5 grams of total cow milk solids substantially free from irritants and inflammatory factors and about ten milliliters of an inert flowable medium, said milk solids resulting from treatment of milk, regardless of source, with heat.

10. The process of claim 7 in which the milk solids and the medicament are injected through the teat orifice into the teat duct of a milk-producing organ.

References Cited in the file of this patent

UNITED STATES PATENTS

| 2,110,208 | Eggert | Mar. 8, 1938 |
| 2,498,374 | Martin | Feb. 21, 1950 |

OTHER REFERENCES

Proc. Staff Meetings of the Mayo Clinic, vol 27, pp. 89–93, Feb. 27, 1952.